United States Patent
Nojima et al.

(10) Patent No.: US 11,236,010 B2
(45) Date of Patent: Feb. 1, 2022

(54) OPTICAL GLASS, OPTICAL ELEMENT, AND PREFORM

(71) Applicant: OHARA INC., Sagamihara (JP)

(72) Inventors: Hiroto Nojima, Kanagawa (JP); Fumihiro Oguri, Kanagawa (JP)

(73) Assignee: OHARA INC., Sagamihara (JP)

( * ) Notice: Subject to any disclaimer, the term of this patent is extended or adjusted under 35 U.S.C. 154(b) by 0 days.

(21) Appl. No.: 16/738,413

(22) Filed: Jan. 9, 2020

(65) Prior Publication Data
US 2020/0223743 A1 Jul. 16, 2020

(30) Foreign Application Priority Data

Jan. 11, 2019 (JP) .............................. JP2019-003785
Nov. 12, 2019 (JP) .............................. JP2019-205034

(51) Int. Cl.
*C03C 3/247* (2006.01)
*C03C 3/155* (2006.01)

(52) U.S. Cl.
CPC .............. *C03C 3/155* (2013.01); *C03C 3/247* (2013.01)

(58) Field of Classification Search
CPC ..................................................... C03C 3/247
See application file for complete search history.

(56) References Cited

U.S. PATENT DOCUMENTS

| 2007/0027017 A1 | 2/2007 | Hachitani |
| 2010/0292066 A1 | 11/2010 | Zou et al. |
| 2016/0122230 A1 | 5/2016 | Shiota |

FOREIGN PATENT DOCUMENTS

| EP | 1930301 A1 | 6/2008 |
| EP | 2119682 A1 | 11/2009 |
| JP | 2007055883 A | 3/2007 |
| JP | 2011037637 A | 2/2011 |
| JP | 2012012282 A | * 1/2012 | ............. C03C 3/247 |

OTHER PUBLICATIONS

EPO Extended Search Report for corresponding EP Application No. 20150898.3; dated Jun. 15, 2020.

* cited by examiner

*Primary Examiner* — Elizabeth A. Bolden
(74) *Attorney, Agent, or Firm* — Cantor Colburn LLP

(57) ABSTRACT

To provide an optical glass having the optical characteristics of a high refractive index and low dispersion, and moreover, which makes it possible to further reduce devitrification and which can be stably obtained, and a preform and an optical element using the same. The optical glass comprises, expressed in cation % (mol %), 17.0% to 42.0% of $P^{5+}$, 7.0% to 30.0% of $Al^{3+}$, more than 0% to 22.0% of $Mg^{2+}$, more than 0% to 25.0% $Ca^{2+}$, more than 0% to 30.0% of $Sr^{2+}$, more than 0% to 35.0% $Ba^{2+}$, and expressed in anion % (mol %), a content ratio of $F^-$ of 37.0 to 64.0%, a content ratio of $O^{2-}$ of 36.0 to 63.0%, a refractive index (nd) of 1.48 to 1.58, and having an Abbe number (vd) of 70 to 88, and a liquidus temperature of 800° C. or less.

8 Claims, No Drawings

OPTICAL GLASS, OPTICAL ELEMENT, AND PREFORM

CROSS REFERENCE TO RELATED APPLICATIONS

The present application claims priority under 35 U.S.C. § 119 to Japanese Patent Application No. 2019-003785 filed on Jan. 11, 2019 and Japanese Application No. 2019-205034, filed on Nov. 12, 2019, the contents of which are incorporated herein by reference.

BACKGROUND OF THE INVENTION

Field of the Invention

The present invention relates to an optical glass, an optical element, and a preform.

Related Art

In recent years, the digitalization and increased definition of equipment utilizing optical systems has rapidly progressed, and in the field of various types of optical equipment such as of photographic equipment such as digital cameras or video cameras or the like, or image replay (projection) equipment such as projectors or projection televisions or the like, the demand for reducing the number of optical elements such as lenses or prisms or the like used in optical systems, and weight reduction and miniaturization of optical systems as a whole has increased.

As the material of an optical element constituting an optical system, a high refractive index, low dispersion glass having a refractive index ($n_d$) of 1.48 to 1.58, and an Abbe number ($v_d$) of 70 to 88 has greatly increased. As such a high refractive index, low dispersion glass, for example, a glass composition represented by Patent Documents 1 to 3 is known.

Patent Document 1: Japanese Unexamined Patent Application, Publication No. 2007-55883
Patent Document 2: Japanese Unexamined Patent Application, Publication No. 2011-37637

SUMMARY OF THE INVENTION

However, a fluorophosphate-based glass such as disclosed in Patent Document 1 and Patent Document 2, in particular when producing the glass or when heat-molding the glass, there is concern of devitrification of the glass arising. Therefore, a high refractive index, low dispersion glass which can further reduce the devitrification and which can be stably obtained is desired.

The present invention was made in consideration of the above problems, and the objective thereof is to provide an optical glass having optical characteristics of a high refractive index and low dispersion, and further, which is capable of further reducing the devitrification and which can be stably obtained, and a preform and an optical element using the same.

The present inventors, as a result of repeated diligent experimentation and research in order to solve the above problems, discovered that by comprising in the glass as cationic components $P^{5+}$, $Al^{3+}$, $Mg^{2+}$, $Ca^{2+}$, and $Ba^{2+}$, and by further adjusting the contents of each component, a stable glass with a low liquidus temperature can be obtained, while having the desired refractive index and Abbe number, and thus arrived at the completion of the present invention. Specifically, the present invention provides the following.

(1) An optical glass comprising, expressed in cation % (mol %),
17.0% to 42.0% of $P^{5+}$,
7.0% to 30.0% of $Al^{3+}$,
more than 0% to 22.0% of $Mg^{2+}$,
more than 0% to 25.0% of $Ca^{2+}$,
more than 0% to 30.0% of $Sr^{2+}$,
more than 0% to 35.0% of $Ba^{2+}$,
expressed in anion % (mol %),
a content ratio of $F^-$ of 37.0 to 64.0%,
a content ratio of $O^{2-}$ of 36.0 to 63.0%,
a refractive index (nd) of 1.48 to 1.58, having an Abbe number (vd) of 70 to 88, and
a liquidus temperature of 800° C. or less.

(2) An optical glass according to (1), wherein a total content ratio ($R^{2+}$:cation %) of one or more selected from the group consisting of $Mg^{2+}$, $Ca^{2+}$, $Sr^{2+}$, and $Ba^{2+}$ is 37.0 to 63.0%.

(3) An optical glass according to (1) or (2), wherein, expressed in cation % (mol %),
a content ratio of $La^{3+}$ is 0 to 10.0%,
a content ratio of $Gd^{3+}$ is 0 to 12.0%,
a content ratio of $Y^{3+}$ is 0 to 12.0%,
a content ratio of $Yb^{3+}$ is 0 to 10.0%,
a content ratio of $Lu^{3+}$ is 0 to 10.0%.

(4) An optical glass according to any one of (1) to (3), wherein a total content ratio ($Ln^{3+}$:cation %) of one or more selected from the group consisting of $La^{3+}$, $Gd^{3+}$, $Y^{3+}$, $Yb^{3+}$, and $Lu^{3+}$ is 13.0% or less.

(5) An optical glass according to any one of (1) to (4), wherein, expressed in cation % (mol %),
a content ratio of $Li^+$ is 0 to 10.0%,
a content ratio of $Na^+$ is 0 to 10.0%,
a content ratio of $K^+$ is 0 to 10.0%.

(6) An optical glass according to any one of (1) to (5), wherein a total content ratio ($Rn^+$:cation %) of one or more selected from the group consisting of $Li^+$, $Na^+$, and $K^+$ is 10.0% or less.

(7) An optical glass according to any one of (1) to (6), wherein, expressed in cation % (mol %),
a content ratio of $Si^{4+}$ is 0 to 10.0%,
a content ratio of $Zn^{2+}$ is 0 to 10.0%,
a content ratio of $B^{3+}$ is 0 to 10.0%,
a content ratio of $Ti^{4+}$ is 0 to 10.0%,
a content ratio of $Nb^{5+}$ is 0 to 10.0%,
a content ratio of $W^{6+}$ is 0 to 10.0%,
a content ratio of $Zr^{4+}$ is 0 to 10.0%,
a content ratio of $Ta^{5+}$ is 0 to 10.0%,
a content ratio of $Ge^{4+}$ is 0 to 10.0%
a content ratio of $Bi^{3+}$ is 0 to 10.0%,
a content ratio of $Te^{4+}$ is 0 to 10.0%.

(8) An optical element consisting of the optical glass according to any one of (1) to (7).

(9) A preform for polishing processing and/or precision mold press molding, consisting of the optical glass according to any one of (1) to (7).

According to the present invention, it is possible to obtain an optical glass having the optical characteristics of a high refractive index and low dispersion, and further, which is not readily devitrified and can be stably obtained, and a preform and an optical element using the same.

DETAILED DESCRIPTION OF THE INVENTION

The optical glass of the present invention comprises, expressed in cation % (mol %), 17.0% to 42.0% of $P^{5+}$, 7.0% to 30.0% of $Al^{3+}$, more than 0% to 22.0% of $Mg^{2+}$, more than 0% to 25.0% of $Ca^{2+}$, more than 0% to 30.0% of $Sr^{2+}$, more than 0% to 35.0% of $Ba^{2+}$, and expressed in anion % (mol %), a content ratio of $F^-$ is 37.0 to 64.0%, a content ratio of $O^{2-}$ is 36.0 to 63.0%, and has a refractive index (nd) of 1.48 to 1.58, an Abbe number (vd) of 70 to 88, and a liquidus temperature is 800° C. or less. As a cation component, $P^{5+}$, $Al^{3+}$, $Mg^{2+}$, $Ca^{2+}$, and $Ba^{2+}$ are contained in the glass, and further, by adjusting the content of each component, an optical glass having the optical characteristics of a high refractive index and a low dispersion, and further a low liquidus temperature can be obtained, whereby an optical glass which does not readily devitrify and which can be stably obtained can be obtained.

Below, embodiments of the optical glass of the present invention are explained in detail. The present invention is not in any way limited to the below embodiments, and within the scope of the objective of the present invention, it may be carried out with suitable modifications added thereto. Further, in portions where explanations would overlap, the explanations may be suitably omitted, but this does not limit the intent of the present invention.

Glass Components

Each component constituting the optical glass of the present invention is explained. In the present specification, unless otherwise mentioned, the content ratios of each component are all expressed in cation % or anion % based on the total mol ratio. Herein, "cation %" and "anion %" (which may also be referred to as "cation % (mol %)" and "anion % (mol %)" in the following), is a composition expressed as a content ratio of each component comprised in the glass, wherein the glass constituent components of the optical glass of the present invention are separated into cation components and anion components, and for each, the total proportion is taken as 100 mol %. Further, the ionic valence of each component is merely used as an expediently representative value, and therefore, ones with other ionic valences are not excluded. The ionic valences of each component present in the optical glass may be other than the representative value. For example, P is usually present in the glass in a state where the ionic valence is 5, therefore, is shown as "$P^{5+}$" in the present specification, but it may be present in a state with other ionic valences. In this way, even though exactly speaking, states of other ionic valences may be present, in the present specification, each component is treated as being present in the glass with the representative value of the ion valence.

Concerning the Cationic Components $P^{5+}$ is a glass-forming component, and has the properties of lowering the liquidus temperature of the glass and reducing devitrification, and increasing the refractive index. Therefore, the content ratio of $P^{5+}$ is preferably 17.0% or more, more preferably more than 20.0%, even more preferably more than 23.0%, even more preferably more than 26.0%, and even more preferably 28.0% or more. On the other hand, by reducing the content ratio of $P^{5+}$ to a range of 42.0% or less, the Abbe number can be increased. Therefore, the content ratio of $P^{5+}$ preferably has an upper limit of 42.0%, and is more preferably less than 39.0%, even more preferably less than 36.0%, and even more preferably less than 33.0%.

$Al^{3+}$ has the properties of lowering the liquidus temperature of the glass and reducing devitrification, increasing the Abbe number, and lowering the abrasiveness. Therefore, the content ratio of the $Al^{3+}$ is preferably 7.0% or more, more preferably more than 10.0%, even more preferably more than 13.0%, and even more preferably more than 15.0%. On the other hand, by reducing the content ratio of $Al^{3+}$ to within the range of 30.0% of less, the refractive index can be increased. Therefore, the content ratio of $Al^{3+}$ preferably has an upper limit of 30.0%, more preferably less than 27.0%, even more preferably less than 25.0%, even more preferably less than 23.0%, and even more preferably less than 21.0%.

$Mg^{2+}$ has the properties of lowering the liquidus temperature of the glass and reducing devitrification, and lowering the abrasiveness. Therefore, the lower limit of the content ratio of $Mg^{2+}$ is preferably more than 0%, more preferably more than 1.0%, more preferably more than 3.0%, even more preferably more than 5.0%, and even more preferably 5.7% or more. On the other hand, by reducing the content ratio of the $Mg^{2+}$ to within the range of 22.0% or less, devitrification due to an excessive content can be reduced, and the desired high refractive index can be readily obtained. Therefore, the content of $Mg^{2+}$ preferably has an upper limit of 22.0%, more preferably less than 20.0%, even more preferably less than 17.0%, even more preferably less than 15.0%, and even more preferably less than 13.0%.

$Ca^{2+}$ has the properties of lowering the liquidus temperature of the glass and reducing devitrification, suppressing reduction of the refractive index, and lowering the abrasiveness. Therefore, the lower limit of the content ratio of the $Ca^{2+}$ is preferably more than 0%, more preferably more than 1.0%, even more preferably more than 3.0%, and even more preferably more than 5.0%. On the other hand, by reducing the content ratio of $Ca^{2+}$ to within the range of 25.0% or less, devitrification due to an excessive content can be reduced, and the desired high refractive index can be readily obtained. Therefore, the content ratio of the $Ca^{2+}$ preferably has an upper limit of 25.0%, and is more preferably less than 22.0%, even more preferably less than 20.0%, and even more preferably less than 17.0%.

$Sr^{2+}$, in the case that the content is more than 0%, has the properties of lowering the liquidus temperature of the glass and reducing devitrification, and suppressing reduction of the refractive index. Therefore, the content ratio of $Sr^{2+}$ is preferably more than 0%, more preferably more than 1.0%, even more preferably more than 3.0%, and even more preferably more than 5.0%. On the other hand, by reducing the content ratio of $Sr^{2+}$ to within the range of 30.0% or less, devitrification due to an excessive content can be reduced, and the desired high refractive index can be readily obtained. Therefore, the content ratio of the $Sr^{2+}$ preferably has an upper limit of 30.0%, and is more preferably less than 27.0%, even more preferably less than 24.0%, and even more preferably less than 21.0%.

$Ba^{2+}$ has the properties of increasing the devitrification resistance of the glass, maintaining a low dispersibility, and increasing the refractive index. Therefore, the content ratio of $Ba^{2+}$ is preferably more than 0%, more preferably more than 1.0%, even more preferably more than 3.0%, even more preferably more than 5.0%, and even more preferably more than 8.0%. On the other hand, by reducing the content ratio of the $Ba^{2+}$ to within the range of 35.0% or less, the devitrification resistance of the glass can be increased, and the density can be made small. Therefore, the content ratio of the $Ba^{2+}$ preferably has an upper limit of 35.0%, and is more preferably less than 32.0%, even more preferably less than 30.0%, even more preferably less than 27.0%, and even more preferably less than 25.0%.

$R^{2+}$ is one or more selected from the group consisting of $Mg^{2+}$, $Ca^{2+}$, $Sr^{2+}$, and $Ba^{2+}$. Further, the total content ratio of $R^{2+}$ is the total of one or more selected from the group consisting of $Mg^{2+}$, $Ca^{2+}$, $Sr^{2+}$, and $Ba^{2+}$. Herein, by making the total content ratio of $R^{2+}$ within the range of 37.0 to 63.0%, a glass with a lower liquidus temperature, and high devitrification resistance can be obtained. Therefore, the lower limit of the total content ratio of $R^{2+}$ is preferably 37.0% or more, more preferably more than 40.0%, even more preferably more than 43.0%, and even more preferably more than 46.0%. Further, the upper limit of the total content ratio of $R^{2+}$ is preferably 63.0% or less, more preferably less than 60.0%, even more preferably less than 57.0%, and even more preferably less than 54.0%.

The optical glass of the present invention preferably has a ratio ($R^{2+}/Al^{3+}$) of the total content ratio of $R^{2+}$ (cation %) with respect to the $Al^{3+}$ content ratio (cation %) of 1.50 to 6.00. In particular, by making the ratio ($R^{2+}/Al^{3+}$) 1.50 or more, the refractive index of the glass can be increased. Therefore, this ($R^{2+}/Al^{3+}$) ratio preferably has a lower limit of 1.50, more preferably 1.80, even more preferably 2.10, and even more preferably 2.40. On the other hand, by making this ratio ($R^{2+}/Al^{3+}$) 6.00 or less, it is possible to restrain the refractive index from increasing beyond what is required, and the Abbe number can be made large. Therefore, this ratio ($R^{2+}/Al^{3+}$) preferably has an upper limit of 6.00, more preferably 5.40, even more preferably 4.80, even more preferably 4.20, even more preferably 3.70, and even more preferably 3.30.

Further, the optical glass according to the present invention preferably has a ratio ($Ba^{2+}/Al^{3+}$) of a $Ba^{2+}$ content ratio (cation %) with respect to the $Al^{3+}$ content ratio (cation %) of 2.50 or less. By making this ratio ($Ba^{2+}/Al^{3+}$) small, it is possible to restrain the refractive index from increasing beyond what is required. Therefore, this ratio ($Ba^{2+}/Al^{3+}$) preferably has an upper limit of 2.50, more preferably 2.00, even more preferably 1.80, even more preferably 1.50, and even more preferably 1.30. On the other hand, the lower limit of the ($Ba^{2+}/Al^{3+}$) ratio may be preferably more than 0, more preferably more than 0.20, and even more preferably more than 0.40.

Further, the optical glass of the present invention preferably has a ratio ($Ba^{2+}/Mg^{2+}$) of the $Ba^{2+}$ content ratio (cation %) with respect to the $Mg^{2+}$ content ratio (cation %) of 5.00 or less. In this way, it is possible to obtain a glass with a low liquidus temperature and a high devitrification resistance. Therefore, this ($Ba^{2+}/Mg^{2+}$) ratio preferably has an upper limit of 5.00, more preferably 4.50, even more preferably 4.00, even more preferably 3.80, even more preferably 3.50, even more preferably 3.20, and even more preferably 3.00. Further, the lower limit of the ($Ba^{2+}/Mg^{2+}$) ratio may be preferably more than 0, more preferably more than 0.50, even more preferably more than 0.70, and even more preferably more than 0.90.

$La^{3+}$, $Gd^{3+}$, $Y^{3+}$, $Yb^{3+}$, and $Lu^{3+}$ are optional components which, in the case that at least any of them has a content of more than 0%, have the property of maintaining a low dispersibility (high Abbe number), increasing the refractive index, and further increasing the devitrification resistance. In particular, the content ratio of one or both of $Gd^{3+}$ and $Y^{3+}$ may preferably be more than 0%, more preferably more than 0.5%, and even more preferably more than 1.0%. On the other hand, by reducing the content ratio of at least any of $La^{3+}$, $Yb^{3+}$, and $Lu^{3+}$ to within the range of 10.0% or less, or reducing the content ratio of one or both of $Gd^{3+}$ and $Y^{3+}$ to 12.0% or less, it is possible to reduce devitrification due to an excessive content of these components. Therefore, the content ratio of $La^{3+}$, $Yb^{3+}$, and $Lu^{3+}$ preferably each has an upper limit of 10.0%, more preferably less than 5.0%, and even more preferably less than 3.0%. Further, the content ratio of one or both of $Gd^{3+}$ and $Y^{3+}$ preferably has an upper limit of 12.0%, more preferably less than 10.0%, even more preferably less than 7.0%, even more preferably less than 4.0%, even more preferably less than 2.0%, and even more preferably less than 1.5%.

$Ln^{3+}$ is one or more selected from the group consisting of $Y^{3+}$, $La^{3+}$, $Gd^{3+}$, $Yb^{3+}$, and $Lu^{3+}$ Further, the total content ratio of $Ln^{3+}$ is the total of one or more selected from the group consisting of $Y^{3+}$, $La^{3+}$, $Gd^{3+}$, $Yb^{3+}$, and $Lu^{3+}$. Herein, by reducing the total content ratio of $Ln^{3+}$ to within the range of 13.0% or less, it is possible to make the glass not readily devitrified. Therefore, the total content ratio of $Ln^{3+}$ preferably has an upper limit of 13.0%, more preferably less than 10.0%, even more preferably less than 7.0%, even more preferably less than 4.0%, and even more preferably less than 2.0%. On the other hand, the lower limit of the total content ratio of $Ln^{3+}$, from the viewpoint of increasing the refractive index and the Abbe number, may preferably be more than 0%, more preferably more than 0.5%, and even more preferably more than 1.0%.

$Li^+$, $Na^+$, and $K^+$ are optional components which, in the case that at least any of them has a content of more than 0%, have the property of lowering the glass transition temperature (Tg), while maintaining devitrification resistance when forming the glass. On the other hand, by reducing the content ratio of at least any of $Li^+$, $Na^+$, and $K^+$ to within the range of 10.0% or less, it is possible to reduce the abrasiveness of the glass, and increase the chemical resistance. Therefore, the content ratio of at least any of $Li^+$, $Na^+$, and $K^+$ each preferably has an upper limit of 10.0%, more preferably less than 5.0%, even more preferably less than 3.0%, even more preferably less than 2.0%, even more preferably less than 1.0%, and even more preferably 0.3% or less. Further, at least any of $Li^+$, $Na^+$ and $K^+$ may not be included.

$Rn^+$ is one or more of the group consisting of $Li^+$, $Na^+$, and $K^+$. Further, the total content ratio of $Rn^+$ is the total of one or more selected from the group consisting of $Li^+$, $Na^+$, and $K^+$. Herein, by reducing the total content ratio of $Rn^+$ to within the range of 10.0% or less, it is possible to reduce the abrasiveness of the glass, and to increase the chemical resistance of the glass. Therefore, the total content ratio of $Rn^+$ preferably has an upper limit of 10.0%, more preferably less than 5.0%, even more preferably less than 3.0%, even more preferably less than 1.0%, and even more preferably 0.3% or less.

$Si^{4+}$ is an optional component which, in the case of a content of more than 0%, has the property of increasing the devitrification resistance, increasing the refractive index, and lowering the abrasiveness of the glass. On the other hand, by reducing the content ratio of $Si^{4+}$ to within the range of 10.0% or less, it is possible to reduce devitrification of the glass due to an excessive content. Therefore, the content ratio of $Si^{4+}$ preferably has an upper limit of 10.0%, more preferably less than 5.0%, even more preferably less than 3.0%, even more preferably less than 1.0%, and most preferably is not included.

$B^{3+}$ is an optional component which, in the case of a content of more than 0%, has the property of increasing the devitrification resistance, increasing the refractive index, and lowering the abrasiveness of the glass. On the other hand, by reducing the content ratio of $B^{3+}$ to within the range of 10.0% or less, it is possible to increase the chemical resistance of the glass. Therefore, the content ratio of $B^{3+}$ preferably has an upper limit of 10.0%, more preferably less than 5.0%, even more preferably less than 3.0%, even more preferably less than 1.0%, and most preferably is not included.

The optical glass of the present invention preferably has a total (cation %) of the content ratio of $P^{5+}$, $Si^{4+}$ and $B^{3+}$ of from 17.0% to 42.0%. Herein, by making the total of the content ratio of $P^{5+}$, $Si^{4+}$ and $B^{3+}$ 17.0% or more, the refractive index of the glass can be increased. Therefore, the sum ($P^{5+}+Si^{4+}+B^{3+}$) of the content ratio thereof has a lower limit that is preferably 17.0%, more preferably 20.0%, even more preferably 23.0%, and even more preferably 26.0%. Further, by making the lower limit of the total of the content ratio of $P^{5+}$, $Si^{4+}$ and $B^{3+}$ 42.0% or less, the Abbe number of the glass can be increased. Therefore, the sum ($P^{5+}+Si^{4+}+B^{3+}$) of the content ratio thereof has an upper limit that is preferably 42.0%, more preferably 40.0%, even more preferably 37.0%, and even more preferably 33.0%.

$Zn^{2+}$, in the case of a content of more than 0%, has the property of decreasing the linear expansion coefficient of the glass, lowering the glass transition point, and increasing the devitrification resistance and acid resistance of the glass. On the other hand, by reducing the content ratio of $Zn^{2+}$ to within the range of 10.0% or less, it is possible to readily obtain the desired low Abbe number. Therefore, the content ratio of $Zn^{2+}$ preferably has an upper limit of 10.0%, more preferably less than 5.0%, even more preferably less than 3.0%, even more preferably less than 1.0%, and most preferably is not included.

$Ti^{4+}$, $Nb^{5+}$, and $W^{6+}$ are optional components which, in the case that at least any of them has a content of more than 0%, have the property of increasing the refractive index of the glass. In addition, $Nb^{5+}$ has the property of increasing the chemical resistance, and $W^{6+}$ has the property of lowering the glass transition temperature. On the other hand, by reducing the content ratio of at least any of $Ti^{4+}$, $Nb^{5+}$, and $W^{6+}$ to within the range of 10.0% or less, it is possible to readily obtain the desired high Abbe number. In addition, by reducing the content ratio of $Ti^{4+}$ and $W^{6+}$ to within these ranges, it is possible to reduce the coloring of the glass. Accordingly, the content ratio of $Ti^{4+}$, $Nb^{5+}$, and $W^{6+}$ each preferably has an upper limit of 10.0%, more preferably less than 5.0%, even more preferably less than 3.0%, and even more preferably less than 1.0%.

$Zr^{4+}$ is an optional component which, in the case of a content of more than 0%, has the property of increasing the refractive index of the glass. On the other hand, by reducing the content ratio of $Zr^{4+}$ to within the range of 10.0% or less, it is possible to reduce striations due to volatilization of components in the glass. Therefore, the content ratio of $Zr^{4+}$ preferably has an upper limit of 10.0%, more preferably less than 5.0%, even more preferably less than 3.0%, and even more preferably less than 1.0%.

$Ta^{5+}$ is an optional component which, in the case of a content of more than 0%, has the property of increasing the refractive index of the glass. On the other hand, by reducing the content ratio of $Ta^{5+}$ to within the range of 10.0% or less, it is possible to reduce devitrification of the glass. Therefore, the content ratio of $Ta^{5+}$ preferably has an upper limit of 10.0%, more preferably less than 5.0%, even more preferably less than 3.0%, and even more preferably less than 1.0%.

$Ge^{4+}$ is an optional component which, in the case of a content of more than 0%, has the property of increasing the devitrification resistance of the glass. On the other hand, by reducing the content ratio of $Ge^{4+}$ to within the range of 10.0% or less, it is possible to reduce the materials cost of the glass. Therefore, the content ratio of $Ge^{4+}$ preferably has an upper limit of 10.0%, more preferably less than 5.0%, even more preferably less than 3.0%, and even more preferably less than 1.0%.

$Bi^{3+}$ and $Te^{4+}$ are optional components which, in the case of more than 0%, have the property of increasing the refractive index of the glass, and lowering the glass transition point. On the other hand, by reducing the content ratio of at least one of $Bi^{3+}$ and $Te^{4+}$ to within the range of 10.0% or less, it is possible to reduce coloring and devitrification of the glass. Therefore, the content ratio of $Bi^{3+}$ and $Te^{4+}$ each preferably has an upper limit of 10.0%, more preferably less than 5.0%, even more preferably less than 3.0%, and even more preferably less than 1.0%.

Concerning the Anionic Components $F^{-}$ has the properties of increasing the abnormal dispersibility and Abbe number of the glass, lowering the glass transition point, and making the glass not readily devitrify. Therefore, the content ratio of $F^{-}$ is preferably 37.0% or more, more preferably more than 40.0%, even more preferably more than 43.0%, and even more preferably more than 46.0%. On the other hand, if the content ratio is large, $F^{-}$ has the properties of excessively increasing the Abbe number of the glass, reducing the refractive index, reducing the liquidus temperature, and lowering the abrasiveness of the glass. Therefore, the content ratio of $F^{-}$ is preferably 64.0% or less, more preferably less than 60.0%, even more preferably less than 57.0%, and even more preferably less than 53.0%.

$O^{2-}$ has the properties of suppressing devitrification of the glass, and suppressing increases in the abrasiveness of the glass. Therefore, the content ratio of $O^{2-}$ is preferably 36.0% or more, more preferably more than 40.0%, even more preferably more than 43.0%, and even more preferably more than 47.0%. On the other hand, in order to readily obtain the effects of the other anionic components, the content ratio of $O^{2-}$ is 63.0% or less, more preferably less than 60.0%, even more preferably less than 57.0%, and even more preferably less than 54.0%.

Further, from the viewpoint of suppressing devitrification of the glass, the total of the content ratio of $O^{2-}$ and the content ratio of $F^{-}$ preferably has a lower limit of 98.0%, more preferably 99.0%, and even more preferably is 100%. Namely, the anionic components other than $O^{2-}$ and $F^{-}$, for example the total of the content of one or more selected from the group consisting of $Cl^{-}$ or $Br^{-}$, $I^{-}$, preferably has an upper limit of 2.0%, more preferably 1.0%, and is most preferably 0%.

The optical glass of the present invention preferably has a ratio ($F^{-}/P^{5+}$) of the $F^{-}$ content ratio (anion %) with respect to the $P^{5+}$ content ratio (cation %) of 1.00 or more. By making this ratio ($F^{-}/P^{5+}$) large, the Abbe number of the glass can be increased. Therefore, this ratio ($F^{-}/P^{5+}$) may preferably have a lower limit of 1.00, more preferably 1.20, and even more preferably 1.40. On the other hand, from the viewpoint of increasing the liquidus temperature of the glass and reducing devitrification, the upper limit of this ($F^{-}/P^{5+}$) ratio may preferably be 3.00 or less, more preferably less than 2.50, even more preferably less than 2.20, even more preferably 2.05 or less, and even more preferably 1.95 or less.

The optical glass of the present invention preferably has a total ($Ba^{2+}+F^{-}$) of the content ratio (cation %) of $Ba^{2+}$ and the content ratio (anion %) of $F^{-}$ of 87.0% or less. In this way, it is possible to increase the liquidus temperature of the glass and reduce devitrification. Therefore, the sum ($Ba^{2+}$+$F^-$) of the content ratio of $Ba^{2+}$ and the content ratio of $F^-$ has an upper limit of preferably 87.0%, more preferably 85.0%, even more preferably 82.0%, even more preferably 80.0%, and even more preferably 77.7%. Further, the lower limit of the sum ($Ba^{2+}$+$F^-$) of the content ratio of $Ba^{2+}$ and the content ratio of $F^-$ may be preferably more than 37.0%, more preferably more than 45.0%, even more preferably more than 50.0%, even more preferably more than 55.0%, and even more preferably more than 58.0%.

Concerning the Other Components

In the optical glass of the present invention, other components may be added as required within a scope which is not detrimental to the characteristics of the glass of the present invention.

Components Which Should Not Be Included

Next, components which should not be included in the optical glass of the present invention, and components which are preferably not included, are explained.

With the exception of Ti, Zr, Nb, W, La, Gd, Y, Yb, and Lu, cations of transition metals such as Cu, Nd, V, Cr, Mn, Fe, Co, Ni, Ag, Mo, and the like, in the case that even small amounts are respectively included individually or compounded, have the properties of coloring the glass and giving rise to absorptions of specific wavelengths in the visible range, and therefore, especially for optical glasses used for wavelengths in the visible region, it is preferable that these are substantially not included.

In recent years there has been a tendency to avoid the use of cations of Pb, As, Th, Cd, Tl, Os, Be, and Se as noxious chemicals, and not only in the manufacturing process of the glass, but also in the processing processes and up to the disposal after the productization, steps are required for environmental measures. Further, cations of S (sulfur) can also give rise to noxious chemical substances ($SO_x$ and the like). Accordingly, in the case that serious consideration is given to environmental effects, the contents of one or more of these is preferably less than 1.0%, more preferably less than 0.5%, and most preferably, one or more of these is substantially not included.

Further, in the present specification, "substantially not included" means preferably making the content less than 0.1%, and more preferably not including these with the exception of inevitable impurities.

Cations of Sb and Ce are useful as defoaming agents, but as components having a disadvantageous impact on the environment, there has been a tendency to not include these in optical glasses in recent years. Therefore, in the optical glass of the present invention, in this point, it is preferable that Sb and Ce are substantially not included.

Production Method

The production method of the optical glass of the present invention is not particularly limited. For example, it can be produced by uniformly blending the above described raw materials such that each component is within the prescribed content ratios, introducing the prepared mixture into a quartz crucible or alumina crucible or platinum crucible and after rough fusion, putting into a platinum crucible, platinum alloy crucible, or iridium crucible and fusing for 2 to 10 hours in a temperature range of 900 to 1200° C., and after having carried out stirring and homogenizing and foam cutting and the like, reducing the temperature to 850° C. or less, carrying out finishing stirring, eliminating striations, casting in a die and annealing.

Properties

The optical glass of the present invention is capable of further reducing devitrification and can be stably obtained. In particular, the liquidus temperature of the optical glass of the present invention preferably has an upper limit of 800° C., and more preferably has an upper limit of any of 780° C., 760° C., 740° C., 720° C., 700° C., and 680° C. In this way, when obtaining the glass, or when hot molding the obtained glass, because the glass is not readily devitrified, a transparent optical glass having the desired chemical properties can be stably obtained. The liquidus temperature in the present invention is the lowest temperature where crystals cannot be acknowledged, when a cullet-shaped glass sample of 25 cc is put into a crucible made of platinum with a capacity of 50 ml and covered with a lid made of alumina, put into a fully fused state at 950° C., then the temperature is reduced to any desired set temperature in 10° C. increments from 900° C. to 600° C. and held for 4 hours, taken from the furnace, and immediately after cooling the glass surface and the interior of the glass are inspected for the presence or absence of crystals. Further, the lower limit of the liquidus temperature of the optical glass of the present invention is not particularly limited, but the optical glass of the present invention may include those where crystals cannot be acknowledged even when the temperature of the fused state glass sample is reduced to 600° C. (namely, ones where the liquidus temperature is 600° C. or less). Further, the lower limit of the liquidus temperature may be 620° C. or 650° C.

The optical glass of the present invention, in addition to having a high refractive index ($n_d$), has a low dispersibility (high Abbe number). The optical glass of the present invention preferably has a refractive index ($n_d$) of 1.48 to 1.58. More specifically, in the optical glass of the present invention, the lower limit of the refractive index is preferably 1.48, more preferably 1.50, and even more preferably 1.52. On the other hand, in the optical glass of the present invention, the upper limit of the refractive index ($n_d$) is preferably 1.58, more preferably 1.56, and even more preferably 1.54 or less than that. The optical glass of the present invention preferably has an Abbe number ($v_d$) of 70 to 88. More specifically, in the optical glass of the present invention, the lower limit of the Abbe number ($v_d$) is preferably 70, more preferably 73, and even more preferably 75. On the other hand, in the optical glass of the present invention, the upper limit of the Abbe number ($v_d$) is preferably 88, more preferably 85, even more preferably 82, and even more preferably 79. By having such a refractive index, it is possible to obtain a large refraction amount of light even when planning to make the optical elements thin. Further, by having such a low dispersion, it is possible to make small the divergence of the focus point (chromatic aberration) according to the wavelength of light when used as a simple lens. Therefore, for example in the case of constituting an optical system in combination with an optical element having a high dispersion (low Abbe number), it is possible to design the optical system as a whole with reduced aberrations and high imaging characteristics and the like. In such a way, the optical glass of the present invention is useful for optical design, and in particular when constituting an optical system, even while designing high imaging characteristics and the like, is it possible to design miniaturization of the optical system, and the degree of freedom of optical design can be broadened.

Preform and Optical Element

From the manufactured optical glass, for example using a means for polishing processing, or a means for hot molding such as reheat press molding or precision mold press molding or the like, a glass molded body can be manufactured. Namely, a glass molded body can be manufactured by carrying out a mechanical process such as grinding and polishing or the like on the optical glass; a preform for mold press molding can be manufactured from the optical glass, and after having carried out reheat press molding on this preform, a glass molded body can be manufactured by carrying out a polishing process; or a glass molded body can be manufactured by carrying out precision mold press molding on the preform manufactured by carrying out a polishing process or a preform molded by a known surfacing molding or the like. Further, the means for manufacturing the glass molded body is not limited to these means.

In such a way, the optical glass of the present invention is useful for various optical elements and optical designs. In particular, among these, forming a preform from the optical glass of the present invention, carrying out reheat press molding or precision mold press molding or the like using this preform, and manufacturing an optical element such as a lens or a prism or the like is preferable. In this way, because it becomes possible to form a preform with a large diameter, even when designing increased size of optical elements, it is possible to realize high resolution and high accuracy imaging characteristics and projection characteristics when used for optical equipment.

A glass molded body consisting of the optical glass of the present invention can, for example, be used for applications of optical elements such as lenses, prisms, mirrors and the like, and typically can be used for equipment which can readily reach high temperatures such as optical equipment for vehicles, or projectors or copiers and the like.

EXAMPLES

The results of the compositions (shown as mol % expressed as cation % and expressed as anion %), refractive index ($n_d$), Abbe number ($v_d$), and liquidus temperature of the glasses of the examples (No. 1 to No. 31) which are optical glasses of the present invention, and the comparative example (No. A) are shown in Table 1 to Table 4. Further, the below examples merely have the objective of illustration, and these examples in no way limit the present invention.

For each of the examples and the comparative example, in each case, as raw materials of each component, respectively corresponding oxides, carbonates, sulfates, fluorides, metaphosphate compounds and the like typically used for fluorophosphate glass were selected as high purity raw materials, and after weighing so as to achieve the composition of each example shown in the tables and uniformly blending, these were put into a platinum crucible and the crucible was covered, and heated for 2 hours at 950° C. using an electric furnace, and along with melting the raw materials, stirring, homogenizing and defoaming and the like were carried out, and after this, once the temperature was reduced to 700° C. or less, cast into a mold, and cooled to manufacture the glass. For the obtained glass, elemental analysis was carried out by the ICP emission spectral analysis method, and the composition (cation %) of the cationic components of the glass composition was determined. On the other hand, concerning the composition of the anionic components, the content of $F^-$ was measured by the ion chromatograph method, the content of $O^{2-}$ was measured by the infrared absorption method, and the contents (anion %) of $F^-$ and $O^{2-}$ were determined with respect to the total of these. The composition (analyzed composition) of the obtained glass was as shown in the tables.

The refractive index ($n_d$) and Abbe number ($v_d$) of the glasses of the examples and the comparative example were measured according to the V block method stipulated in JIS B 7017-2:2018. Herein, the refractive index ($n_d$) shows the measured value with respect to the d-line (587.56 nm) of a helium lamp. Further, the Abbe number ($v_d$) was calculated from the formula Abbe number ($v_d$)=[($n_d$−1)/($n_F$−$n_C$)], using the values of the refractive index with respect to the d-line of a helium lamp, and the refractive index ($n_F$) with respect to the F-line (486.13 nm) and the refractive index ($n_C$) with respect to the C-line (656.27 nm) of a hydrogen lamp. The refractive index ($n_d$) and Abbe number ($v_d$) were determined by carrying out measurements for a glass obtained with a slow cooling temperature drop rate of −25° C./hr.

As the liquidus temperature of the glasses of the examples and the comparative example, the lowest temperature where crystals could not be acknowledged when a 25 cc glass sample in the shape of a cullet is put into a platinum crucible with a volume of 50 ml and is covered with an alumina lid, is put into a completely fused state at 950° C., then the temperature is reduced to any desired set temperature in 10° C. increments from 900° C. to 600° C. and held for 4 hours, taken from the furnace, and immediately after cooling the glass surface and the interior of the glass are inspected for the presence or absence of crystals.

TABLE 1

| | | Example | | | | | | | |
|---|---|---|---|---|---|---|---|---|---|
| | | 1 | 2 | 3 | 4 | 5 | 6 | 7 | 8 |
| Composition | $P^{5+}$ | 30.30 | 30.41 | 30.96 | 30.96 | 30.96 | 30.96 | 30.96 | 30.52 |
| | $Al^{3+}$ | 16.92 | 16.11 | 17.42 | 17.42 | 17.42 | 17.42 | 17.42 | 17.68 |
| | $Mg^{2+}$ | 8.16 | 12.53 | 8.34 | 6.28 | 8.34 | 8.34 | 8.34 | 8.41 |
| | $Ca^{2+}$ | 12.75 | 16.58 | 13.20 | 13.20 | 11.14 | 13.20 | 13.20 | 13.09 |
| | $Sr^{2+}$ | 14.42 | 10.56 | 12.42 | 12.42 | 12.42 | 10.36 | 12.42 | 14.80 |
| | $Ba^{2+}$ | 16.65 | 13.80 | 16.86 | 18.92 | 18.92 | 18.92 | 16.86 | 14.16 |
| | $Y^{3+}$ | 0.00 | 0.00 | 0.00 | 0.00 | 0.00 | 0.00 | 0.00 | 0.00 |
| | $Gd^{3+}$ | 0.79 | 0.00 | 0.79 | 0.79 | 0.79 | 0.79 | 0.79 | 1.34 |
| | Total of cationic components | 100.0 | 100.0 | 100.0 | 100.0 | 100.0 | 100.0 | 100.0 | 100.0 |

TABLE 1-continued

|  |  | Example | | | | | | | |
| --- | --- | --- | --- | --- | --- | --- | --- | --- | --- |
|  |  | 1 | 2 | 3 | 4 | 5 | 6 | 7 | 8 |
|  | $O^{2-}$ | 48.43 | 50.09 | 49.26 | 49.26 | 49.26 | 49.26 | 50.75 | 50.38 |
|  | $F^-$ | 51.57 | 49.91 | 50.74 | 50.74 | 50.74 | 50.74 | 49.25 | 49.62 |
|  | Total of anionic components | 100.0 | 100.0 | 100.0 | 100.0 | 100.0 | 100.0 | 100.0 | 100.0 |
|  | $Mg^{2+} + Ca^{2+} + Sr^{2+} + Ba^{2+}$ | 51.98 | 53.47 | 50.82 | 50.82 | 50.82 | 50.82 | 50.82 | 50.46 |
|  | $(Mg^{2+} + Ca^{2+} + Sr^{2+} + Ba^{2+})/Al^{3+}$ | 3.07 | 3.32 | 2.92 | 2.92 | 2.92 | 2.92 | 2.92 | 2.85 |
|  | $Ba^{2+}/Al^{3+}$ | 0.98 | 0.86 | 0.97 | 1.09 | 1.09 | 1.09 | 0.97 | 0.80 |
|  | $Ba^{2+}/Mg^{2+}$ | 2.04 | 1.10 | 2.02 | 3.01 | 2.27 | 2.27 | 2.02 | 1.68 |
|  | $La^{3+} + Gd^{3+} + Y^{3+} + Yb^{3+} + Lu^{3+}$ | 0.79 | 0.00 | 0.79 | 0.79 | 0.79 | 0.79 | 0.79 | 1.34 |
|  | $Li^+ + Na^+ + K^+$ | 0.00 | 0.00 | 0.00 | 0.00 | 0.00 | 0.00 | 0.00 | 0.00 |
|  | $P^{5+} + Si^{4+} + B^{3+}$ | 30.30 | 30.41 | 30.96 | 30.96 | 30.96 | 30.96 | 30.96 | 30.52 |
|  | $F^-/P^{5+}$ | 1.70 | 1.64 | 1.64 | 1.64 | 1.64 | 1.64 | 1.59 | 1.63 |
|  | $Ba^{2+} + F^-$ | 68.22 | 63.71 | 67.60 | 69.66 | 69.66 | 69.66 | 66.11 | 63.78 |
| Characteristics | Refractive index ($n_d$) | 1.5260 | 1.5237 | 1.5255 | 1.5283 | 1.5273 | 1.5264 | 1.5286 | 1.5284 |
|  | Abbe number ($v_d$) | 76.6 | 75.6 | 77.4 | 78.0 | 76.3 | 76.1 | 77.1 | 76.5 |
|  | Liquidus temperature [° C.] | 680 | 680 | 680 | 680 | 680 | 680 | 700 | 680 |

TABLE 2

|  |  | Example | | | | | | | |
| --- | --- | --- | --- | --- | --- | --- | --- | --- | --- |
|  |  | 9 | 10 | 11 | 12 | 13 | 14 | 15 | 16 |
| Composition | $P^{5+}$ | 29.25 | 30.96 | 30.96 | 29.68 | 32.18 | 30.96 | 30.96 | 30.96 |
|  | $Al^{3+}$ | 18.11 | 17.42 | 17.42 | 17.20 | 17.63 | 17.42 | 17.42 | 17.42 |
|  | $Mg^{2+}$ | 8.20 | 8.34 | 8.34 | 8.59 | 8.11 | 10.40 | 8.34 | 8.34 |
|  | $Ca^{2+}$ | 13.12 | 11.14 | 13.20 | 13.59 | 12.84 | 11.14 | 9.08 | 9.08 |
|  | $Sr^{2+}$ | 15.47 | 14.48 | 8.30 | 12.79 | 12.08 | 12.42 | 16.54 | 12.42 |
|  | $Ba^{2+}$ | 14.51 | 16.86 | 20.98 | 17.35 | 16.40 | 16.86 | 16.86 | 20.98 |
|  | $Y^{3+}$ | 0.00 | 0.00 | 0.00 | 0.00 | 0.00 | 0.00 | 0.00 | 0.00 |
|  | $Gd^{3+}$ | 1.35 | 0.79 | 0.79 | 0.81 | 0.76 | 0.79 | 0.79 | 0.79 |
|  | Total of cationic components | 100.0 | 100.0 | 100.0 | 100.0 | 100.0 | 100.0 | 100.0 | 100.0 |
|  | $O^{2-}$ | 46.63 | 49.26 | 50.75 | 47.66 | 50.77 | 49.26 | 49.26 | 49.26 |
|  | $F^-$ | 53.37 | 50.74 | 49.25 | 52.34 | 49.23 | 50.74 | 50.74 | 50.74 |
|  | Total of anionic components | 100.0 | 100.0 | 100.0 | 100.0 | 100.0 | 100.0 | 100.0 | 100.0 |
|  | $Mg^{2+} + Ca^{2+} + Sr^{2+} + Ba^{2+}$ | 51.30 | 50.82 | 50.82 | 52.32 | 49.43 | 50.82 | 50.82 | 50.82 |
|  | $(Mg^{2+} + Ca^{2+} + Sr^{2+} + Ba^{2+})/Al^{3+}$ | 2.83 | 2.92 | 2.92 | 3.04 | 2.80 | 2.92 | 2.92 | 2.92 |
|  | $Ba^{2+}/Al^{3+}$ | 0.80 | 0.97 | 1.20 | 1.01 | 0.93 | 0.97 | 0.97 | 1.20 |
|  | $Ba^{2+}/Mg^{2+}$ | 1.77 | 2.02 | 2.52 | 2.02 | 2.02 | 1.62 | 2.02 | 2.52 |
|  | $La^{3+} + Gd^{3+} + Y^{3+} + Yb^{3+} + Lu^{3+}$ | 1.35 | 0.79 | 0.79 | 0.81 | 0.76 | 0.79 | 0.79 | 0.79 |
|  | $Li^+ + Na^+ + K^+$ | 0.00 | 0.00 | 0.00 | 0.00 | 0.00 | 0.00 | 0.00 | 0.00 |
|  | $P^{5+} + Si^{4+} + B^{3+}$ | 29.25 | 30.96 | 30.96 | 29.68 | 32.18 | 30.96 | 30.96 | 30.96 |
|  | $F^-/P^{5+}$ | 1.82 | 1.64 | 1.59 | 1.76 | 1.53 | 1.64 | 1.64 | 1.64 |
|  | $Ba^{2+} + F^-$ | 67.88 | 67.60 | 70.23 | 69.69 | 65.63 | 67.60 | 67.60 | 71.72 |
| Characteristics | Refractive index ($n_d$) | 1.5284 | 1.5263 | 1.5279 | 1.5229 | 1.5281 | 1.5239 | 1.5260 | 1.5278 |
|  | Abbe number ($v_d$) | 76.5 | 77.1 | 76.9 | 77.6 | 76.0 | 75.7 | 76.8 | 76.9 |
|  | Liquidus temperature [° C.] | 680 | 660 | 680 | 680 | 680 | 740 | 680 | 680 |

TABLE 3

|  |  | Example | | | | | | | |
| --- | --- | --- | --- | --- | --- | --- | --- | --- | --- |
|  |  | 17 | 18 | 19 | 20 | 21 | 22 | 23 | 24 |
| Composition | $P^{5+}$ | 30.96 | 33.20 | 31.01 | 30.96 | 30.96 | 30.96 | 31.51 | 30.88 |
|  | $Al^{3+}$ | 17.42 | 18.68 | 17.45 | 17.42 | 17.42 | 17.42 | 15.93 | 17.37 |
|  | $Mg^{2+}$ | 10.40 | 8.94 | 8.35 | 10.40 | 8.34 | 8.34 | 5.70 | 8.32 |
|  | $Ca^{2+}$ | 7.02 | 14.15 | 13.22 | 13.20 | 15.26 | 13.20 | 13.44 | 13.16 |

TABLE 3-continued

|  |  | Example | | | | | | | |
|---|---|---|---|---|---|---|---|---|---|
|  |  | 17 | 18 | 19 | 20 | 21 | 22 | 23 | 24 |
|  | $Sr^{2+}$ | 12.42 | 5.94 | 12.44 | 10.36 | 10.36 | 14.48 | 15.44 | 15.13 |
|  | $Ba^{2+}$ | 20.98 | 18.25 | 16.74 | 16.86 | 16.86 | 14.80 | 17.17 | 14.36 |
|  | $Y^{3+}$ | 0.00 | 0.00 | 0.00 | 0.00 | 0.00 | 0.00 | 0.00 | 0.00 |
|  | $Gd^{3+}$ | 0.79 | 0.84 | 0.79 | 0.79 | 0.79 | 0.79 | 0.81 | 0.79 |
|  | Total of cationic components | 100.0 | 100.0 | 100.0 | 100.0 | 100.0 | 100.0 | 100.0 | 100.0 |
|  | $O^{2-}$ | 49.26 | 53.63 | 48.47 | 49.26 | 49.26 | 49.26 | 50.54 | 50.69 |
|  | $F^-$ | 50.74 | 46.37 | 51.53 | 50.74 | 50.74 | 50.74 | 49.46 | 49.31 |
|  | Total of anionic components | 100.0 | 100.0 | 100.0 | 100.0 | 100.0 | 100.0 | 100.0 | 100.0 |
|  | $Mg^{2+} + Ca^{2+} + Sr^{2+} + Ba^{2+}$ | 50.82 | 47.28 | 50.75 | 50.82 | 50.82 | 50.82 | 51.75 | 50.97 |
|  | $(Mg^{2+} + Ca^{2+} + Sr^{2+} + Ba^{2+})/Al^{3+}$ | 2.92 | 2.53 | 2.91 | 2.92 | 2.92 | 2.92 | 3.25 | 2.93 |
|  | $Ba^{2+}/Al^{3+}$ | 1.20 | 0.98 | 0.96 | 0.97 | 0.97 | 0.85 | 1.08 | 0.83 |
|  | $Ba^{2+}/Mg^{2+}$ | 2.02 | 2.04 | 2.00 | 1.62 | 2.02 | 1.77 | 3.01 | 1.73 |
|  | $La^{3+} + Gd^{3+} + Y^{3+} + Yb^{3+} + Lu^{3+}$ | 0.79 | 0.84 | 0.79 | 0.79 | 0.79 | 0.79 | 0.81 | 0.79 |
|  | $Li^+ + Na^+ + K^+$ | 0.00 | 0.00 | 0.00 | 0.00 | 0.00 | 0.00 | 0.00 | 0.00 |
|  | $P^{5+} + Si^{4+} + B^{3+}$ | 30.96 | 33.20 | 31.01 | 30.96 | 30.96 | 30.96 | 31.51 | 30.88 |
|  | $F^-/P^{5+}$ | 1.64 | 1.40 | 1.66 | 1.64 | 1.64 | 1.64 | 1.57 | 1.60 |
|  | $Ba^{2+} + F^-$ | 71.72 | 64.62 | 68.27 | 67.60 | 67.60 | 65.54 | 66.63 | 63.67 |
| Character-istics | Refractive index ($n_d$) | 1.5270 | 1.5263 | 1.5233 | 1.5229 | 1.5242 | 1.5232 | 1.5297 | 1.5280 |
|  | Abbe number ($\upsilon_d$) | 77.1 | 75.8 | 76.7 | 76.1 | 76.5 | 77.2 | 75.4 | 76.5 |
|  | Liquidus temperature [° C.] | 680 | 700 | 680 | 680 | 680 | 680 | 660 | 680 |

TABLE 4

|  |  | Example | | | | | | | Comparative Example |
|---|---|---|---|---|---|---|---|---|---|
|  |  | 25 | 26 | 27 | 28 | 29 | 30 | 31 | A |
| Composition | $P^{5+}$ | 30.96 | 30.96 | 30.96 | 28.78 | 30.86 | 26.93 | 26.93 | 24.42 |
|  | $Al^{3+}$ | 17.42 | 17.42 | 17.42 | 18.96 | 17.37 | 20.23 | 20.23 | 23.84 |
|  | $Mg^{2+}$ | 11.09 | 8.34 | 8.34 | 8.92 | 11.06 | 8.69 | 8.69 | 11.03 |
|  | $Ca^{2+}$ | 10.46 | 9.77 | 6.34 | 9.60 | 10.42 | 10.91 | 10.91 | 7.18 |
|  | $Sr^{2+}$ | 15.17 | 15.85 | 19.29 | 5.71 | 15.13 | 6.75 | 6.75 | 9.58 |
|  | $Ba^{2+}$ | 14.12 | 16.86 | 16.86 | 25.35 | 14.37 | 23.77 | 23.77 | 11.95 |
|  | $Zn^{2+}$ |  |  |  |  |  |  |  | 10.58 |
|  | $Y^{3+}$ |  |  |  | 1.06 |  | 1.25 | 2.74 | 1.42 |
|  | $Gd^{3+}$ | 0.79 | 0.79 | 0.79 | 1.63 | 0.79 | 1.49 |  |  |
|  | Total of cationic components | 100.0 | 100.0 | 100.0 | 100.0 | 100.0 | 100.0 | 100.0 | 100.0 |
|  | $O^{2-}$ | 49.26 | 49.26 | 49.26 | 50.14 | 50.84 | 46.12 | 46.12 | 32.52 |
|  | $F^-$ | 50.74 | 50.74 | 50.74 | 49.86 | 49.16 | 53.88 | 53.88 | 67.48 |
|  | Total of anionic components | 100.0 | 100.0 | 100.0 | 100.0 | 100.0 | 100.0 | 100.0 | 100.0 |
|  | $Mg^{2+} + Ca^{2+} + Sr^{2+} + Ba^{2+}$ | 50.84 | 50.82 | 50.83 | 49.58 | 50.98 | 50.12 | 50.12 | 39.73 |
|  | $(Mg^{2+} + Ca^{2+} + Sr^{2+} + Ba^{2+})/Al^{3+}$ | 2.92 | 2.92 | 2.92 | 2.61 | 2.93 | 2.48 | 2.48 | 1.67 |
|  | $Ba^{2+}/Al^{3+}$ | 0.81 | 0.97 | 0.97 | 1.34 | 0.83 | 1.17 | 1.17 | 0.50 |
|  | $Ba^{2+}/Mg^{2+}$ | 1.27 | 2.02 | 2.02 | 2.84 | 1.30 | 2.74 | 2.74 | 1.08 |
|  | $La^{3+} + Gd^{3+} + Y^{3+} + Yb^{3+} + Lu^{3+}$ | 0.79 | 0.79 | 0.79 | 2.69 | 0.79 | 2.74 | 2.74 | 1.42 |
|  | $Li^+ + Na^+ + K^+$ | 0.00 | 0.00 | 0.00 | 0.00 | 0.00 | 0.00 | 0.00 | 0.00 |
|  | $P^{5+} + Si^{4+} + B^{3+}$ | 30.96 | 30.96 | 30.96 | 28.78 | 30.86 | 26.93 | 26.93 | 24.42 |
|  | $F^-/P^{5+}$ | 1.64 | 1.64 | 1.64 | 1.73 | 1.59 | 2.00 | 2.00 | 2.76 |
|  | $Ba^{2+} + F^-$ | 64.86 | 67.60 | 67.60 | 75.21 | 63.53 | 77.65 | 77.65 | 79.42 |
| Character-istics | Refractive index ($n_d$) | 1.5210 | 1.5247 | 1.5256 | 1.5381 | 1.5253 | 1.5283 | 1.5276 | 1.5058 |
|  | Abbe number ($\upsilon_d$) | 78.0 | 76.8 | 76.7 | 75.6 | 77.0 | 77.2 | 76.6 | 77.2 |
|  | Liquidus temperature [° C.] | 680 | 680 | 680 | 680 | 700 | 660 | 660 | >800 |

As shown in the tables, the optical glasses of the examples of the present invention all have a liquidus temperature of 800° C. or less, which was within the desired range. On the other hand, the optical glass of the comparative example had a liquidus temperature exceeding 800° C. Therefore, it became clear that the optical glasses of the examples of the present invention have a lower liquidus temperature than the glass of the comparative example.

Further, the optical glasses of the examples of the present invention all had a refractive index of 1.48 or more, more specifically 1.52 or more, which was within the desired range. Further, the optical glasses of the examples of the present invention all had an Abbe number of 70 or more, more specifically 75 or more, which was within the desired range.

Accordingly, it became clear that the optical glasses of the examples of the present invention have a refractive index and Abbe number within the desired ranges, and a low liquidus temperature. From this, it can be understood that the optical glasses of the examples of the present invention do not readily devitrify and can be more stably obtained.

Furthermore, using the optical glasses of the examples of the present invention, grinding and polishing were carried out after having formed a preform for polishing processing, and were processed into the forms of a lens and a prism. Further, using the optical glasses of the examples of the present invention, a preform for precision mold press molding was formed, and processed into the form of a lens and a prism by precision mold press molding these preforms. In all cases, these could be processed into the various lens and prism forms.

Above, a detailed explanation was given with the objective of illustrating the present invention, but the present examples merely have the objective of illustration, and it is to be understood that many modifications can be made by one skilled in the art without deviating from the concept and scope of the present invention.

What is claimed is:

1. An optical glass comprising, expressed in cation % (mol %),
    17.0% to 42.0% of $P^{5+}$,
    more than 10.0% to less than 23.0% of $Al^{3+}$,
    more than 0% to 22.0% of $Mg^{2+}$,
    more than 0% to 25.0% of $Ca^{2+}$,
    more than 0% to 30.0% of $Sr^{2+}$,
    more than 0% to 35.0% of $Ba^{2+}$,
    comprising, expressed in anion % (mol %),
    37.0% to 64.0% of $F^-$,
    36.0% to 63.0% of $O^{2-}$,
    a total content ($Rn^+$:cation %) of one or more selected from the group consisting of $Li^+$, $Na^+$ and $K^+$ of less than 5.0%,
    a ratio ($R^{2+}/Al^{3+}$) of the total content ratio ($R^{2+}$:cation %) of the group consisting of $Mg^{2+}$, $Ca^{2+}$, $Sr^{2+}$ and $Ba^{2+}$, with respect to the $Al^{3+}$ content ratio (cation %) of 2.40 to 6.00,
    a ratio ($Ba^{2+}/Mg^{2+}$) of $Ba^{2+}$ content (cation %) to $Mg^{2+}$ content (cation %) of 3.00 or less,
    a ratio ($F^-/P^{5+}$) of $F^-$ content (anion %) to $P^{5+}$ content (cation %) of less than 2.20,
    a refractive index (nd) of 1.50 to 1.54,
    an Abbe number (vd) of 70 to 88, and
    a liquidus temperature of 800° C. or less.

2. The optical glass according to claim 1, wherein a total content ($R^{2+}$:cation %) of the group consisting of $Mg^{2+}$, $Ca^{2+}$, $Sr^{2+}$, and $Ba^{2+}$ is 37.0 to 63.0%.

3. An optical glass according to claim 1, wherein, expressed in cation % (mol %),
    a content ratio of $La^{3+}$ is 0 to 10.0%,
    a content of $Gd^{3+}$ is 0 to 12.0%,
    a content of $Y^{3+}$ is 0 to 12.0%,
    a content of $Yb^{3+}$ is 0 to 10.0%,
    a content of $Lu^{3+}$ is 0 to 10.0%.

4. An optical glass according to claim 1, wherein a total content ($Ln^{3+}$:cation %) of one or more selected from the group consisting of $La^{3+}$, $Gd^{3+}$, $Y^{3+}$, $Yb^{3+}$, and $Lu^{3+}$ is 13.0% or less.

5. An optical glass according to claim 1, wherein
    a content of $Li^+$ is less than 5.0%,
    a content of $Na^+$ is less than 5.0%,
    a content of $K^+$ is less than 5.0%.

6. An optical glass according to claim 1, wherein
    a content of $Si^{4+}$ is 0 to 10.0%,
    a content of $B^{3+}$ is 0 to 10.0%,
    a content of $Zn^{2+}$ is 0 to 10.0%,
    a content of $Ti^{4+}$ is 0 to 10.0%,
    a content of $Nb^{5+}$ is 0 to 10.0%,
    a content of $W^{6+}$ is 0 to 10.0%,
    a content of $Zr^{4+}$ is 0 to 10.0%,
    a content of $Ta^{5+}$ is 0 to 10.0%,
    a content of $Ge^{4+}$ is 0 to 10.0%
    a content of $Bi^{3+}$ is 0 to 10.0%,
    a content of $Te^{4+}$ is 0 to 10.0%.

7. An optical element consisting of an optical glass according to claim 1.

8. A preform for polishing processing and/or precision press molding consisting of the optical glass according to claim 1.

* * * * *